United States Patent
Lundberg

(10) Patent No.: US 10,397,485 B2
(45) Date of Patent: Aug. 27, 2019

(54) MONITORING CAMERA DIRECTION CONTROL

(71) Applicant: Axis AB, Lund (SE)

(72) Inventor: Stefan Lundberg, Lund (SE)

(73) Assignee: Axis AB, Lund (SE)

( * ) Notice: Subject to any disclaimer, the term of this patent is extended or adjusted under 35 U.S.C. 154(b) by 108 days.

(21) Appl. No.: 15/702,202

(22) Filed: Sep. 12, 2017

(65) Prior Publication Data

US 2018/0077357 A1    Mar. 15, 2018

(30) Foreign Application Priority Data

Sep. 12, 2016    (EP) .................................... 16188251

(51) Int. Cl.
| | |
|---|---|
| *G06T 7/70* | (2017.01) |
| *H04N 5/232* | (2006.01) |
| *G06K 9/00* | (2006.01) |
| *G06T 7/20* | (2017.01) |
| *G08B 13/196* | (2006.01) |
| *H04N 7/18* | (2006.01) |
| *G06T 7/62* | (2017.01) |
| *G06K 9/62* | (2006.01) |

(52) U.S. Cl.
CPC ..... *H04N 5/23296* (2013.01); *G06K 9/00771* (2013.01); *G06T 7/20* (2013.01); *G06T 7/70* (2017.01); *G08B 13/1963* (2013.01); *H04N 5/23216* (2013.01); *H04N 7/18* (2013.01); *H04N 7/183* (2013.01); *G06K 9/6267* (2013.01); *G06T 7/62* (2017.01); *G06T 2207/30232* (2013.01)

(58) Field of Classification Search
None
See application file for complete search history.

(56) References Cited

U.S. PATENT DOCUMENTS

| | | | |
|---|---|---|---|
| 2005/0168574 A1 | 8/2005 | Lipton et al. | |
| 2006/0187306 A1 | 8/2006 | Matsui | |
| 2011/0081043 A1* | 4/2011 | Sabol | G06T 7/254 382/103 |
| 2015/0042812 A1 | 2/2015 | Tang et al. | |
| 2015/0156423 A1* | 6/2015 | Lundberg | H04N 5/23203 348/169 |
| 2015/0378566 A1 | 12/2015 | Rondao Alface et al. | |
| 2018/0032845 A1* | 2/2018 | Polak | G06K 9/6269 |

FOREIGN PATENT DOCUMENTS

WO    WO 2010/064445 A1    6/2010

OTHER PUBLICATIONS

Extended European Search Report dated Feb. 7, 2017 in European application 16188251.9, filed on Sep. 12, 2016 (with Written Opinion).
Jacob M. Gryn et al. "Detecting motion patterns via direction maps with application to surveillance," Computer Vision and Image Understanding 113, 2009, pp. 17.

* cited by examiner

*Primary Examiner* — Eileen M Adams
(74) *Attorney, Agent, or Firm* — Oblon, McClelland, Maier & Neustadt, L.L.P.

(57) ABSTRACT

A camera control unit, having "learned" how objects typically move in a monitored scene, provides help to an operator by moving a monitoring camera according to representative movement of the objects in the scene. The representative movement may be derived in a learning procedure using object motion analysis.

14 Claims, 3 Drawing Sheets

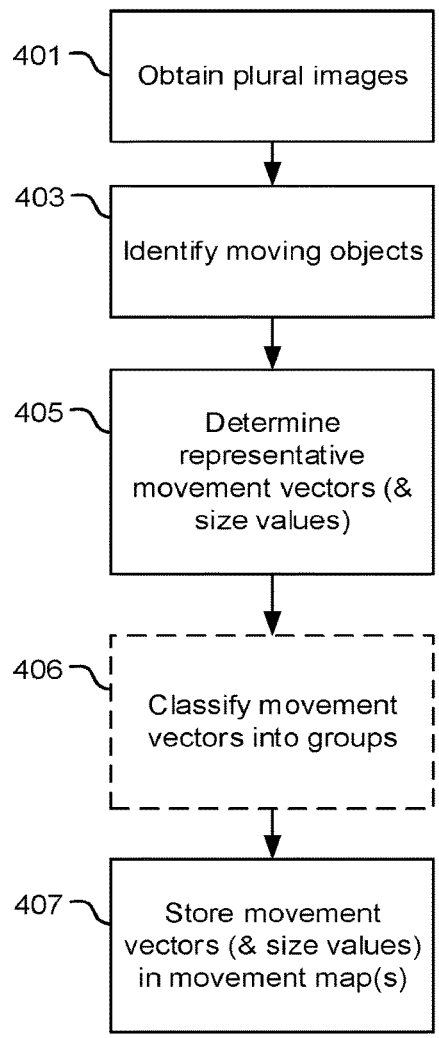
Fig. 4
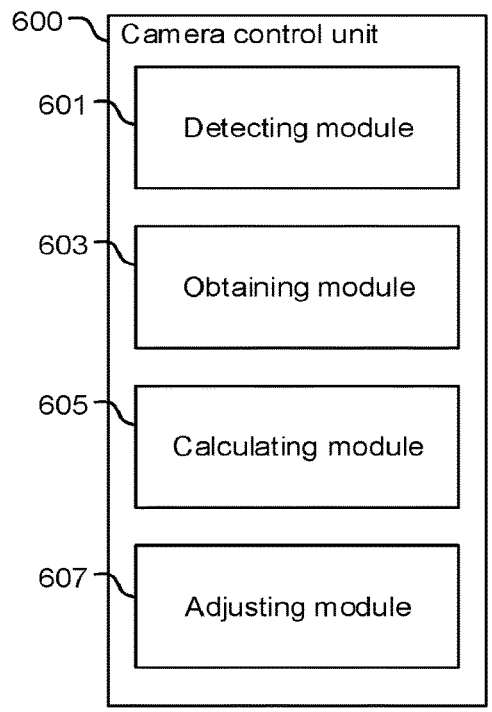
Fig. 5
Fig. 6

MONITORING CAMERA DIRECTION CONTROL

TECHNICAL FIELD

Embodiments herein relate to controlling at least pan and tilt of a camera that is monitoring a scene.

BACKGROUND

In a surveillance or monitoring system that comprises one or more monitoring cameras being under the control of an operator who is interacting with a camera control unit, it is in most scenarios very important that the operator is able to identify and follow (e.g. on a display device) a moving object of interest in a monitored scene. Typically, a camera in a monitoring system is configured such that it can rotate around a tilt axis and rotate around a pan axis and also configured to zoom a lens attached to the camera. An often used acronym for such a camera is PTZ, where "P" represents pan, "T" represents tilt and "Z" represents zoom. Small electronic motors are typically used to provide the necessary rotation/movement in pan, tilt and zoom and the operator is typically operating an appropriate user input device such as a computer mouse or joystick in order to provide adjustment signals for controlling the pan, tilt and zoom motors.

It is easily envisaged that it is difficult for operators of such PTZ configured cameras to manually follow/track moving objects in a scene with the PTZ camera if objects in the scene are moving in a non-optimal direction. A non-optimal direction is a direction that requires more than one camera motor to move, e.g. rotation in both pan and tilt simultaneously. This is independent of whether the input device is a mouse or a joystick. It will be even more difficult for the operator in case the camera shall be zoomed so the object covers a large portion of the current field of view on the display (e.g. be zoomed in enough). Needless to say, fast moving objects such as vehicles are sometimes extremely difficult to follow.

The prior art comprises the international patent application publication WO 2010/064445 A1, which describes a camera device with a rotation table. Position and speed for a detected object is used in combination with a detected manual operation speed of the rotation table for assisting an operator to track the object.

SUMMARY

In view of the above, an object of the present disclosure is to overcome or at least mitigate at least some of the drawbacks related to prior art PTZ cameras.

This is achieved in a first aspect by a method performed by a camera control unit. The camera control unit is configured to adjust, from a current pan and tilt (PT) position, at least pan and tilt of a camera that is monitoring a scene in a monitoring direction. The method comprises detecting an adjustment signal that originates from a user input device where the adjustment signal represents at least a desired adjustment of the monitoring direction. A representative movement vector that is representative of movement of objects in the scene is obtained and, based on the representative movement vector and based on at least the desired adjustment of the monitoring direction, a calculation is made of a corrected adjustment signal. The corrected adjustment signal is then used to adjust at least pan and tilt of the camera.

In other words, the present disclosure provides a method where a camera control unit, having "learned" how objects typically move in a scene thereby provides help to an operator by moving the camera according to a representative movement. As will be described more in the following, the representative movement may be derived from object motion analysis.

In some embodiments the obtaining of a representative movement vector may comprise identifying, in a first movement map, a map position that corresponds to the monitoring direction. The representative movement vector may then be read from the identified map position in the first movement map.

For example, in some of these embodiments may comprise selecting, using the desired adjustment of the monitoring direction, the first movement map from a plurality of candidate movement maps. Each such candidate movement map may comprise movement vectors that are aligned along a respective typical movement direction, where the typical movement direction corresponds to the desired adjustment of the monitoring direction.

These candidate movement maps may be created by obtaining a plurality of images of the scene and identifying a plurality of moving objects in the scene. Based on the identified moving objects, representative movement vectors for respective parts of the scene may be determined. The representative movement vectors may then be classified into groups, each group being defined by a typical movement direction. The movement vectors may be stored in a respective candidate movement map, each candidate movement map comprising movement vectors that are aligned along said respective typical movement direction.

Alternatively, in some embodiments, the first movement map may be created by obtaining a plurality of images of the scene, in which scene a plurality of moving objects are identified. Based on the identified moving objects, representative movement vectors for respective parts of the scene may be determined and stored in the first movement map.

In some embodiments the adjustment signal may represent, in addition to representing a desired adjustment of the monitoring direction, a desired adjustment of zoom of the camera. In such embodiments, the method further comprises obtaining a representative size value that is representative of size of the moving objects in the scene in the monitoring direction. The calculation of the corrected adjustment signal may then further be based on the representative size value, and the adjustment, based on the corrected adjustment signal, may then comprise adjusting pan, tilt and zoom of the camera.

In some embodiments, the representative size value may be read from the identified map position in the first movement map. In such embodiments, representative sizes of objects for the respective parts of the scene may be determined based on the identified moving objects and the representative sizes may then be stored in the first movement map.

Alternatively, in some embodiments, representative sizes of objects for the respective parts of the scene may be determined based on the identified moving objects and the representative sizes may then be stored in the candidate movement maps.

These embodiments illustrate that the camera control unit may learn how the scene looks like and calculate the most probably motion directions in a grid over the scene. Then, when the operator adjusts the camera in a direction very similar to the typical direction, then the camera control unit will adjust the movements slightly to follow the typical movement instead of going straight according to the adjustment made by the operator.

As some of the embodiments illustrate, learning may be done by placing the camera in the widest position, i.e. enabling a view of the whole of the scene, and doing automatic object tracking with, e.g., an appropriate motion detection procedure. Learning can also be done by analyzing parts of the scene and merging all movement information later. For each part of the scene the tracking is done for each object passing in the scene and direction and also size may be determined and saved for use in some embodiments. When enough object has passed each part of the scene a grid of typical directions and size changes are calculated. The grid may then be used to adjust pan/tilt and zoom when an operator is repositioning the camera.

In a second aspect, there is provided camera control unit, which is configured to adjust, from a current pan and tilt position, at least pan and tilt of a camera that is monitoring a scene in a monitoring direction. The camera control unit comprises a processor, memory and input/output circuitry. The memory contains instructions executable by the processor whereby the camera control unit is operative to:
  detect an adjustment signal that originates from a user input device, said adjustment signal representing at least a desired adjustment of the monitoring direction,
  obtain a representative movement vector, v, that is representative of movement of objects in the scene,
  calculate, based on the representative movement vector and based on at least the desired adjustment of the monitoring direction, a corrected adjustment signal, and
  adjust, using the corrected adjustment signal, at least pan and tilt of the camera.

In another aspect there is provided a computer program, comprising instructions which, when executed on at least one processor in a camera control unit, cause the camera control unit to carry out the method as summarized above in connection with the first aspect and the various embodiments of this aspect.

In another aspect there is provided a carrier comprising a computer program according to the summarized aspect above, wherein the carrier is one of an electronic signal, an optical signal, a radio signal and a computer readable storage medium.

These other aspects provide the same effects and advantages as summarized above in connection with the method of the first aspect.

BRIEF DESCRIPTION OF THE DRAWINGS

FIG. 4 is a flowchart of a method,
FIG. 5 schematically illustrates a movement map, and
FIG. 6 schematically illustrates a camera control unit.

DETAILED DESCRIPTION

Figure 1A:
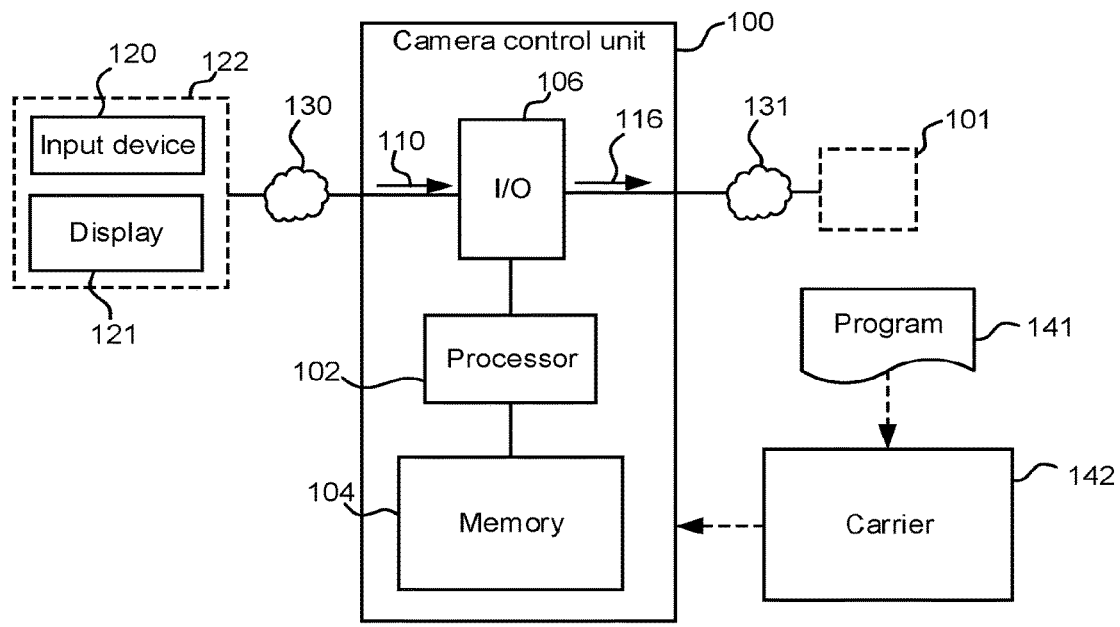
FIG. 1a schematically illustrates a camera control unit,
FIG. 1b schematically illustrates a camera and a scene,
FIG. 1c-d schematically illustrate a camera,
FIG. 2 schematically illustrates a scene.
Figure 1B:
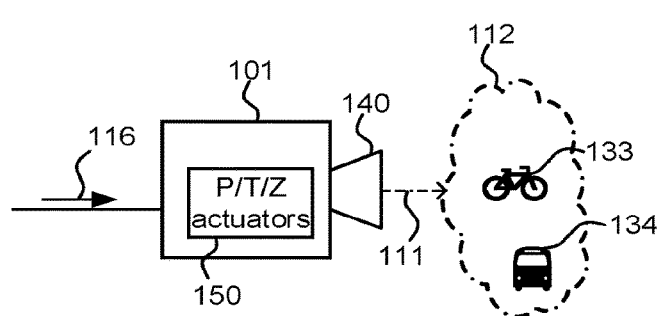

As FIG. 1a and FIG. 1b exemplifies, a camera control unit 100 configured to adjust, from a current pan and tilt, PT, position, at least pan and tilt of a camera 101 that is monitoring a scene 112 in a monitoring direction 111. The camera control unit 100 comprises a processor 102, memory 104 and input/output circuitry 106. The memory 104 contains instructions executable by the processor 102 whereby the camera control unit 100 is operative to perform embodiments of a method as will be described below in connection with FIGS. 2 to 5.

An input device 120 and a display 121, typically forming part of a computer 122 that is operated by an operator/user, are connected via the computer 122 to the camera control unit 100. The computer 122 is typically connected by means of well-known communication networks (wireless and/or wired) as schematically illustrated by a cloud 130. For example, the input device 120 may be a keypad, a computer mouse, a trackball, a touchpad, a joystick etc. The configuration of the computer 122 together with the input device 120 is such that it is capable of providing an adjustment signal 110 that represents a desired adjustment of, e.g., a camera 101 that is connected to the camera control unit 100. The computer 122 is connected via the input/output circuitry 106 to the processor 102 in the camera control unit 100 and, as is known to the skilled person, the input/output circuitry 106 may perform any necessary processing of the adjustment signal 110 such that it can be handled by the processor 102 as will be discussed in detail below.

As will be exemplified below, the camera control unit 100 will adjust at least pan and tilt, and in some embodiments also zoom, of the camera 101 by means of a corrected adjustment signal 116. The corrected adjustment signal 116 is created by the processor 102 in cooperation with the input/output circuitry 106 and the corrected adjustment signal 116 is provided to the camera 101 via well-known communication networks (wireless and/or wired) as schematically illustrated by a cloud 131.

As the skilled person will realize, the camera 101 may be panned, tilted and zoomed by means of respective pan (P), tilt (T) and zoom (Z) actuators that are reactive to the corrected adjustment signal 116. Any circuitry that is needed to convert the corrected adjustment signal 116 into signals/voltages/currents needed by such actuators is well known in the art and is therefore omitted from the figures for the sake of clarity. For example, using actuators that are based on stepper motors or direct driven motors, the corrected adjustment signal 116 may be converted into, e.g., a pulse width modulated (PWM) signal recognizable, typically after being amplified, by the actuators.

Figure 1C:
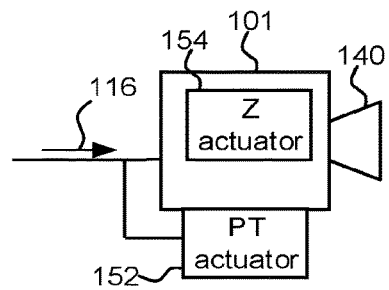

Typically, pan and tilt actuators are arranged together and zoom actuators are typically arranged at a lens system 140 attached to the camera 101. FIG. 1b illustrates a first example where a PTZ actuator 150 is arranged in the camera 101. In FIG. 1c, a PT actuator 152 is arranged outside the camera 101, e.g. arranged in the form of a platform, while a Z actuator 154 is arranged inside the camera. The corrected adjustment signal 116 is provided to the PT actuator 152 outside the camera 101 and to the camera 101 in which the Z actuator 154 is arranged.

Figure 1D:
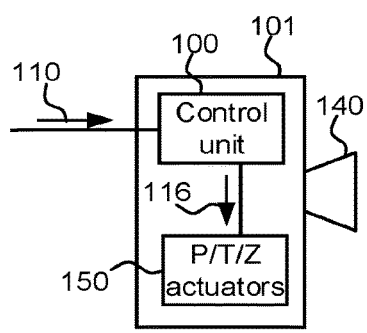
Figure 2:
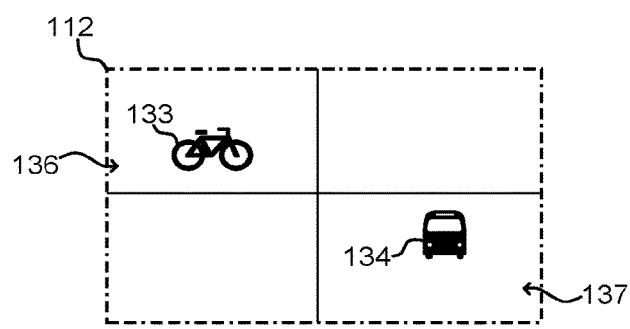
Figure 3A:
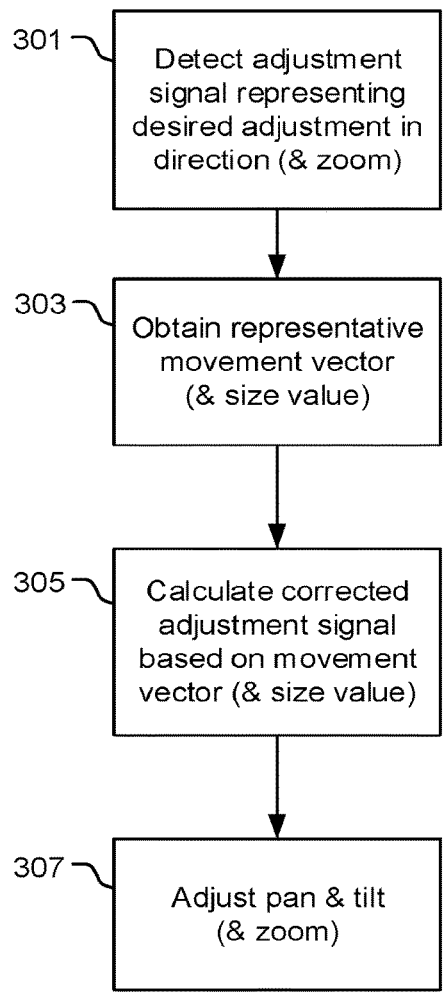
FIGS. 3a-b are flowcharts of embodiments of methods.
Figure 3B:
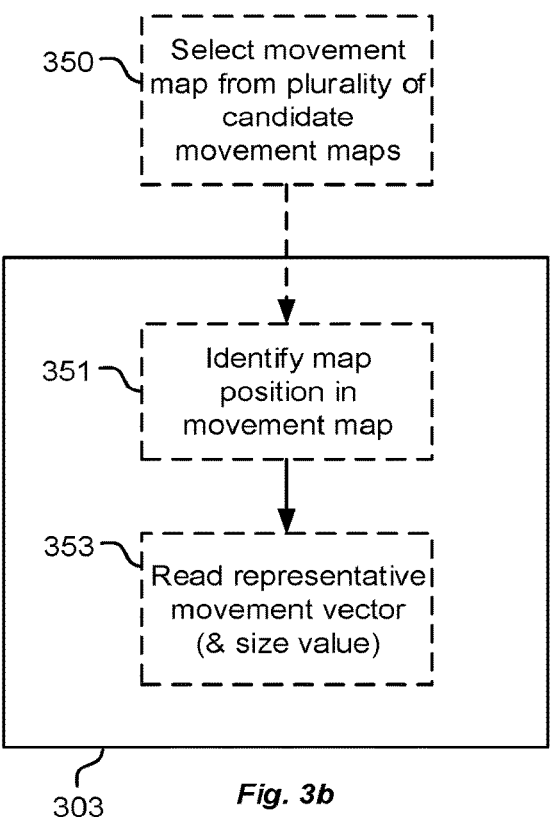

Yet another example is illustrated in FIG. 1d, where the control unit 100 is arranged inside the camera 101 together with the PTZ actuators 150. In such examples, the adjustment signal 110 is provided to the camera control unit 100 inside the camera 101.

Turning now to FIG. 2, FIGS. 3a-b, FIG. 4 and FIG. 5, with continued reference to FIGS. 1a-d, embodiments of a method that is performed by the camera control unit 100 will be described with reference to a number of actions. As mentioned above, the camera control unit 100 is configured to adjust, from a current PT position, at least pan and tilt of the camera 101 that is monitoring the scene 112 in the monitoring direction 111.

Action 301

A detection is made of an adjustment signal 110 that originates from a user input device 120. The adjustment signal 110 represents at least a desired adjustment of the monitoring direction 111.

In some embodiments, the adjustment signal 110 may represent, in addition to representing a desired adjustment of the monitoring direction 111, a desired adjustment of zoom, Z, of the camera 101.

As the skilled person will realize, adjustment of monitoring direction may be expressed in an angular unit per time unit, such as degrees per second, in a spherical coordinate system. Adjustment of zoom may be expressed as a scaling factor, e.g. represented by an integer value within an interval.

Action 303

A representative movement vector, v, is obtained. The representative movement vector is representative of movement of objects 133,134 in the scene 112. As the skilled person will realize, the movement vector may be expressed using angular unit per time unit in a spherical coordinate system.

The obtaining of the representative movement vector may in some embodiments, as illustrated by action 351, comprise identifying, in a first movement map 500, a map position 502 that corresponds to the monitoring direction 111. Then, as illustrated by an action 353, the representative movement vector v may be read from the identified map position 502 in the first movement map 500. As FIG. 5 exemplifies, the movement vector "11, 12, 42" corresponds to the map position having (x, y) coordinates (123, 654).

The identifying of the map position 502 that corresponds to the monitoring direction 111 may be done, e.g., in a manner that is similar to how a camera performs a procedure such as automatic exposure control where a predetermined or user selected area around a centre-point is considered, e.g."spot", "center average", "weighted average" etc. That is, the representative movement vector may actually be a calculated value based not only on one single reading from the movement map 500, but calculated using weighted values of movement vectors corresponding to the monitoring direction 111 as well as values around the directions in the movement map that corresponds to the monitoring direction 111.

In some embodiments, as illustrated by an action 350, the first movement map 500 may be selected, using the desired adjustment of the monitoring direction, from a plurality of candidate movement maps 510. Each such candidate movement map 510 may comprise movement vectors that are aligned along a respective typical movement direction that corresponds to the desired adjustment of the monitoring direction. For example, in a scenario where the scene 112 in the monitoring direction 111 is a 4-way road intersection, a first candidate movement map 510 may comprise representative movement vectors that are in an up/down direction and a second candidate movement map 510 may comprise representative movement vectors that are in a left/right direction. Successive desired adjustments of the monitoring direction 111, e.g. as a consequence of an operator wishing to follow a vehicle that makes a 90 degree turn in the intersection, may then result in that the selection in action 350 entails switching from the first candidate movement map to the second candidate movement map.

In embodiments where the adjustment signal 110 also represents zoom, a representative size value, D, may be obtained. Such a representative size value is then representative of a size of the moving objects in the scene 112 in the monitoring direction 111. For example, the representative size value, D, may in some of the embodiments be read from the identified map position in the first movement map 500. In order for the size value D to be comparable with a zoom value, the obtained size value D may have to be converted into an integer value in an interval using an appropriate conversion algorithm that takes into account any characteristics of the lens system in use.

Action 305

A corrected adjustment signal 116 is calculated based on the representative movement vector and based on at least the desired adjustment of the monitoring direction.

In embodiments where the adjustment signal 110 also represents zoom, the calculation of the corrected adjustment signal 116 is further based on the representative size value D.

Action 307

Using the corrected adjustment signal 116, at least pan and tilt of the camera is then adjusted.

In embodiments where the adjustment signal 110 also represents zoom, the adjustment comprises adjusting pan, tilt and zoom of the camera.

The calculation and use of a corrected adjustment signal 116 in action 305 and action 307, respectively, may in some embodiments be conditioned such that they are performed only if the adjustment signal 110 indicates a value for the adjustment of the monitoring direction that is close (within a configurable "delta" value) to the representative movement vector. Otherwise, the detected adjustment signal 110 is used without correction to adjust at least the pan and tilt of the camera 101.

With specific reference to FIG. 4, embodiments where the representative movement vector v is read from the first movement map 500 include those that comprise the following actions that may be seen as a learning procedure where one or more movement maps is learned by the camera control unit 100:

Action 401

A plurality of images of the scene 112 are obtained.

Action 403

A plurality of moving objects are identified in the scene 112.

Action 405

Based on the identified moving objects 133, 134, representative movement vectors for respective parts 136,137 of the scene 112 are determined.

In some embodiments, also representative sizes of objects for the respective parts of the scene may be determined, based on the identified moving objects.

Action 406

In embodiments where the first movement map 500 is selected from a plurality of candidate movement maps 510, the representative movement vectors are classified into groups, each group being defined by a typical movement direction.

Action 407

The movement vectors are stored in the first movement map 500. In the embodiments where the first movement map 500 is selected from a plurality of candidate movement maps 510, action 407 involves storing the movement vectors in a respective candidate movement map 510, each candidate movement map 510 comprising movement vectors that are aligned along said respective typical movement direction.

In embodiments where also representative sizes of objects are determined, these representative sizes are also stored in the first movement map 500 or in the candidate movement maps 510.

In the above described embodiments, the issue of focussing has not been addressed explicitly. However, it is to be noted that also focussing, e.g. auto-focussing procedures that operate in the camera control unit 100, may make use of the corrected adjustment signal 116 as one of its input. With this help focusing can be faster and during difficult conditions so called focus hunting can be avoided.

Moreover, in the above described embodiments and the associated figures, references to the concepts pan, tilt and zoom are assumed to be related to spatial movement of, e.g, actuators and lens systems. However, it is to be noted that these concepts may be applied to a scenario wherein the camera is a so-called 360-camera that operates without any spatial rotation or zoom movement. Such a camera captures images in all directions around the camera, i.e. a more or less hemispherical coverage. In such scenarios, the monitoring direction and the values for pan, tilt and zoom may be defined in virtual terms and, consequently, all embodiments described herein are applicable also in a 360-camera scenario.

Referring back to FIG. 1a, the camera control unit 100 will be described in some more detail. The camera control unit 100 is configured to adjust, from a current pan and tilt, PT, position, at least pan and tilt of a camera 101 that is monitoring a scene in a monitoring direction. The camera control unit 100 comprises a processor 102, memory 104 and input/output circuitry 106. The memory 104 contains instructions executable by the processor 102 whereby the camera control unit 100 is operative to:

- detect an adjustment signal 110 that originates from a user input device 120, said adjustment signal 110 representing at least a desired adjustment of the monitoring direction,
- obtain a representative movement vector, v, that is representative of movement of objects in the scene,
- calculate, based on the representative movement vector and based on at least the desired adjustment of the monitoring direction, a corrected adjustment signal 116, and
- adjust, using the corrected adjustment signal 116, at least pan and tilt of the camera 101.

The instructions that are executable by the processor 102 may be software in the form of a computer program 141. The computer program 141 may be contained in or by a carrier 142, which may provide the computer program 141 to the memory 104 and processor 102. The carrier 142 may be in any suitable form including an electronic signal, an optical signal, a radio signal or a computer readable storage medium.

In some embodiments, the camera control unit 100 is operative such that the obtaining of a representative movement vector comprises:

- identifying, in a first movement map, a map position that corresponds to the monitoring direction,
- reading, from the identified map position in the first movement map, the representative movement vector.

In some embodiments, the camera control unit 100 is operative to:

- select, using the desired adjustment of the monitoring direction, the first movement map from a plurality of candidate movement maps, where each candidate movement map comprises movement vectors that are aligned along a respective typical movement direction, said typical movement direction corresponding to the desired adjustment of the monitoring direction.

In some embodiments, the camera control unit 100 is operative such that the first movement map is created by:

- obtaining a plurality of images of the scene,
- identifying a plurality of moving objects in the scene,
- determining, based on the identified moving objects, representative movement vectors for respective parts of the scene,
- storing the movement vectors in the first movement map.

In some embodiments, the camera control unit 100 is operative such that the candidate movement maps are created by:

- obtaining a plurality of images of the scene,
- identifying a plurality of moving objects in the scene,
- determining, based on the identified moving objects, representative movement vectors for respective parts of the scene,
- classifying the representative movement vectors into groups, each group being defined by a typical movement direction, and
- storing the movement vectors in a respective candidate movement map, each candidate movement map comprising movement vectors that are aligned along said respective typical movement direction.

In some embodiments, the camera control unit 100 operative such that:

- the adjustment signal represents, in addition to representing a desired adjustment of the monitoring direction, a desired adjustment of zoom, Z, of the camera 101, and operative to:
- obtain a representative size value, D, that is representative of size of the moving objects in the scene in the monitoring direction, and operative such that
- the calculation of the corrected adjustment signal is further based on the representative size value, and
- the adjustment, based on the corrected adjustment signal, comprises adjusting pan, tilt and zoom of the camera 101.

In some embodiments, the camera control unit 100 is operative to:

- read, from the identified map position in the first movement map, the representative size value.

In some embodiments, the camera control unit 100 is operative to:

- determine, based on the identified moving objects, representative sizes of objects for the respective parts of the scene, and
- store the representative sizes in the first movement map.

In some embodiments, the camera control unit 100 is operative to:

- determine, based on the identified moving objects, representative sizes of objects for the respective parts of the scene, and
- store the representative sizes in the candidate movement maps.

FIG. 6 illustrates schematically a camera control unit 600 configured to adjust, from a current pan and tilt, PT, position, at least pan and tilt of a camera that is monitoring a scene in a monitoring direction. The camera control unit 600 comprises:

- a detecting module 601 configured to detect an adjustment signal that originates from a user input device, said adjustment signal representing at least a desired adjustment of the monitoring direction,
- an obtaining module 603 configured to obtain a representative movement vector, v, that is representative of movement of objects in the scene,
- a calculating module 605 configured to calculate, based on the representative movement vector and based on at least the desired adjustment of the monitoring direction, a corrected adjustment signal 116, and an adjusting module 607 configured to adjust, using the corrected adjustment signal 116, at least pan and tilt of the camera 101.

The camera control unit 600 may comprise further modules that are configured to perform in a similar manner as, e.g., the camera control unit 100 described above in connection with FIG. 1a.

The invention claimed is:

1. A method performed by a camera controller, said camera controller being configured to adjust, from a current pan and tilt position, at least pan and tilt of a camera that is monitoring a scene in a monitoring direction, the method comprising:

detecting an adjustment signal from a user input device, said adjustment signal representing an angular adjustment of the monitoring direction received by the user input device, obtaining a representative movement vector that is representative of movement of objects in the scene, calculating, based on the representative movement vector and based on the angular adjustment of the monitoring direction received by the user input device, a corrected adjustment signal, and adjusting, using the corrected adjustment signal, at least pan and tilt of the camera.

2. The method of claim 1, wherein the obtaining of the representative movement vector comprises:

identifying, in a first movement map, a map position that corresponds to the monitoring direction, reading, from the identified map position in the first movement map, the representative movement vector.

3. The method of claim 2, comprising:

selecting, using the angular adjustment of the monitoring direction received by the user input device, the first movement map from a plurality of candidate movement maps, where each candidate movement map comprises movement vectors that are aligned along a respective typical movement direction, said typical movement direction corresponding to the angular adjustment of the monitoring direction received by the user input device.

4. The method of claim 3, wherein the candidate movement maps are created by:

obtaining a plurality of images of the scene, identifying a plurality of moving objects in the scene, determining, based on the identified moving objects, representative movement vectors for respective parts of the scene, classifying the representative movement vectors into groups, each group being defined by a typical movement direction, and storing the movement vectors in a respective candidate movement map, each candidate movement map comprising movement vectors that are aligned along said respective typical movement direction.

5. The method of claim 2, wherein the first movement map is created by:

obtaining a plurality of images of the scene, identifying a plurality of moving objects in the scene, determining, based on the identified moving objects, representative movement vectors for respective parts of the scene, storing the movement vectors in the first movement map.

6. The method of claim 5, wherein:

the adjustment signal represents, in addition to representing he angular adjustment of the monitoring direction received by the user input device, a desired adjustment of zoom of the camera, the method further comprising:

obtaining a representative size value that is representative of size of the moving objects in the scene in the monitoring direction, and wherein the calculation of the corrected adjustment signal is further based on the representative size value, and the adjusting, using the corrected adjustment signal, comprises adjusting pan, tilt and zoom of the camera.

7. The method of claim 6, comprising:

reading, from the identified map position in the first movement map, the representative size value.

8. The method of claim 7, comprising:

determining, based on the identified moving objects, representative sizes of objects for the respective parts of the scene, and storing the representative sizes in the first movement map.

9. The method of claim 7, comprising:

determining, based on the identified moving objects, representative sizes of objects for the respective parts of the scene, and storing the representative sizes in the candidate movement maps.

10. A non-transitory computer-readable storage medium storing computer-readable instructions which, when executed on at least one processor in a camera controller, cause the camera controller to carry out the method according to claim 1.

11. A camera controller, said camera controller being configured to adjust, from a current pan and tilt position, at least pan and tilt of a camera that is monitoring a scene in a monitoring direction, the camera controller comprising a processor, memory and input/output circuitry, said memory containing instructions executable by said processor to control the camera controller to:

detect an adjustment signal from a user input device, said adjustment signal representing an angular adjustment of the monitoring direction received by the user input device, obtain a representative movement vector that is representative of movement of objects in the scene, calculate, based on the representative movement vector and based on the angular adjustment of the monitoring direction received by the user input device, a corrected adjustment signal, and adjust, using the corrected adjustment signal, at least pan and tilt of the camera.

12. The camera controller of claim 11, wherein the obtaining of the representative movement vector comprises:

identifying, in a first movement map, a map position that corresponds to the monitoring direction, reading, from the identified map position in the first movement map, the representative movement vector.

13. The camera controller of claim 12, further configured to:

select, using the angular adjustment of the monitoring direction received by the user input device, the first movement map from a plurality of candidate movement maps, where each candidate movement map comprises movement vectors that are aligned along a respective typical movement direction, said typical movement direction corresponding to the angular adjustment of the monitoring direction received by the user input device.

14. The camera controller of claim 12, wherein the first movement map is created by:
obtaining a plurality of images of the scene,
identifying a plurality of moving objects in the scene,
determining, based on the identified moving objects, representative movement vectors for respective parts of the scene,
storing the movement vectors in the first movement map.

* * * * *